United States Patent Office 3,365,503
Patented Jan. 23, 1968

3,365,503
PROCESS FOR RECOVERING THE USEFUL PRODUCTS FROM THE DRAINED FRACTION IN THE PRODUCTION OF PHENOL FROM BENZOIC ACID
Aldo Forni, Galliate, Novara, and Piero Ramello and Luigi Cavalli, Novara, Italy, assignors to Montecatini Edison S.p.A., a corporation of Italy
No Drawing. Filed Mar. 3, 1964, Ser. No. 349,177
Claims priority, application Italy, Mar. 5, 1963, 4,680/63
1 Claim. (Cl. 260—621)

Our invention relates to an improvement in the process for the production of phenols by catalytic oxidation of carboxylic acids. More particularly it relates to a method for the separation of pitches from the drained fraction resulting from such phenol production.

Phenols can be obtained by subjecting carboxylic aromatic acids in the liquid phase to oxidation, in the presence of copper salts acting as catalysts and in the presence of catalysis promoters. Such processes, disclosed for example in U.S. Patents No. 2,727,926, No. 2,852,567 and No. 2,764,587, are used particularly for the production of phenol from benzoic acid.

The production of phenol by those processes is accompanied by the formation of high molecular weight by-products, referred to as pitches. Continuous production of phenol requires removing the pitches from the reactor to avoid their accumulation. For economical production of phenol the pitch content of the reactor must be maintained below about 20%, preferably at about 5 to 10%.

For thus keeping the pitch content in the reactor at the desired level, a portion of the liquid reaction mass must be drained continuously. The drained portion consists not only of pitches but also of useful products, such as benzoic acid, phenyl benzoate and metal benzoates (catalysts). If these useful products were wasted, the losses would be so high as to make the process uneconomical. It is necessary, therefore, to provide for separation of the products from the pitches, so that the useful products contained in the drained reaction masses can be recycled to the reactor.

According to U.S. Patent 2,954,407, the separation can be carried out by extraction with water in the liquid phase at a temperature of 100° to 175° C.

The amounts of water used may vary from 50 to 500% by weight with respect to the drained reaction mass treated. The aqueous solution of useful products thus obtained is then recycled to the reactor. Due to the presence of the copper and magnesium oxides, however, this method fails to completely separate the useful products from the pitches. The loss due to incomplete separation is so great that the economics of the method are still unfavorable.

By operating according to the above-mentioned process at 175° C. and under pressure, we have extracted 1 kg. of drained reaction mass with 1½ kg. of water. The extraction on the drained reaction mass was repeated with six additional units of water to a total weight of 9 kg. water; the ratio of water to drained liquid reaction mass being 9:1. However, even with such large amounts of water, the residue after extraction still contained 45% of usable products.

The useful products mostly consist of phenyl benzoate, small amounts of copper benzoate and traces of benzoic acid and magnesium benzoate.

The extraction residue has such a high viscosity that a continuous discharge from the extraction vessel is difficult. At 175° C., the viscosity of the residue is greater than 50,000 centipoises.

In addition to the extraction with water under pressure, the possibility of recovering the useful products of the drained mass by extraction with various solvents has been explored, but even operating in countercurrent at different stages, the results obtained have been similar to those obtained by extraction with water.

We have now found, according to this invention, that it is possible to perform a separation and to obtain a residue in which the pitches are present in amounts of up to about 90 to 96%, with a practically complete recovery of useful products. According to the process of our present invention, the drained reaction mass is first subjected to hydrolysis with a steam current and then to extraction by organic solvents diluted with water. The hydrolysis is carried out at temperatures between 150° and 300° C. and under pressures between 1 and 30 atmospheres, preferably between 180° and 240° C. and 3 to 12 atm.

The organic solvents preferably used are: aliphatic alcohols and ketones containing up to 4 carbon atoms.

The total steam consumption amounts to 1 to 3 kg. per 1 kg. of drained reaction mass. The duration of the hydrolysis operation is 1 to 4 hours. In general ½ kg. of steam is used per hour per kg. of drained reaction mass, for a time of 2½ hours. The time increases with the percentage of phenyl benzoate present in the drained mass.

The hydrolysis under atmospheric pressure requires a considerable consumption of steam and heat (due to the evaporation of benzoic acid and of phenol). It is preferable, therefore, to operate under pressure. In practice, the temperature and pressure are interrelated so that each temperature corresponds to a given pressure in order to yield the maximum hydrolysis. For example, with a drained reaction mass containing 25% of phenyl benzoate and by operating at 240° C., a pressure of 10 to 12 atm. must be maintained to obtain the maximum hydrolysis; at 220° C. the pressure must be 8 atm.; at 200° C. a pressure of 4 to 6 atm. is sufficient.

To secure maximal hydrolysis with a drained reaction mass containing 55% of phenyl benzoate, a pressure of 6 atm. is required when operating at 200° C., but at 180° C. a pressure of 3 atm. is preferable.

Operating under continuous pressure affords the advantage of lower steam consumption. The heat requirement is also reduced to negligible values since the evaporation of benzoic acid is minimized. In this way 50 to 70% of phenol produced by hydrolysis passes in the vapor phase, is condensed and collected while the remaining portion remains in the hydrolysis residue as free phenol and is recovered in the successive extraction treatment.

After hydrolysis, the phenyl benzoate content of the residue is reduced to between 2 and 4%. This residue is discharged from the autoclave, cooled, pulverized and then extracted at room temperature with an organic solvent diluted with water. Preferably used is a mixture of acetone and water, containing 50 to 70%, preferably 60% of acetone. The amount of acetone employed is about 0.5 to 2 kg. per kg. of hydrolysis residue. A solvent diluted with water is used to limit the amount of pitch dissolved. The treatment is preferably carried out at room temperature. At higher temperatures greater amounts of pitch are dissolved and the granules may be agglomerated.

The extraction residue consisting of more than 85% of pitches is discarded. The extract is distilled to recover the solvent. The distillation residue consists of useful products, namely benzoic acid, free phenol, catalysts and some phenyl benzoate. These products are recycled to the oxidation reactor after separation of phenol.

The following examples illustrate the prior art and the advantages of the invention thereover. The examples are merely illustrative and are not meant to limit the scope of the invention. Equivalents of the materials and operations within the scope of the art and claims are also applicable according to the invention.

EXAMPLE 1 (Prior Art)

100 g. of drained reaction mass were subjected to extraction in countercurrent in three stages with 200 g. of a 60% acetone solution in water.

The drained reaction mass used had the following composition:

| | Percent |
|---|---|
| Phenyl benzoate | 20.96 |
| Copper benzoate | 3.68 |
| Magnesium benzoate | 9.9 |
| Pitches | 10.9 |
| Benzoic acid | 56.48 |

The residue obtained after extraction had a pitch content of 54.4%; the rest consisting of 35% of phenyl benzoate and 10% of copper benzoate.

EXAMPLE 2

The drained reaction mass having the composition of Example 1 was subjected to hydrolysis with a steam current at the temperature of 240° C. under atmospheric pressure. The operation was carried out in a glass flask heated and provided with a reflux condenser kept at 130° C. which makes it possible to reflux most of the entrained benzoic acid and allows the passage of water and phenol in the vapor phase.

The amount of steam used was 1 kg. per kg. of drained mass subjected to hydrolysis.

The hydrolysis residue obtained had the following composition:

| | Percent |
|---|---|
| Phenyl benzoate | 8 |
| Copper benzoate | 4.5 |
| Magnesium benzoate | 9.9 |
| Pitches | 13.4 |
| Benzoic acid | 64.20 |

This hydrolysis residue was subjected to countercurrent extraction with 60% aqueous acetone, and gave a residue containing 87.5% of pitches, 9.6% of phenyl benzoate and 2.8% of copper benzoate.

This example shows that by operating according to the invention much better results are obtained than by operating according to the prior art as in Example 1.

EXAMPLE 3

1 kg. of drained mass having the composition of Example 1 was subjected to hydroylsis by operating in an autoclave at temperatures of 240° C. and under a pressure of 10 kg./cm.$^2$.

Through a pump, 800 g./h. of water were continuously fed to the autoclave, and the vapor phase was continuously discharged and condensed to maintain the desired pressure in the autoclave. After operating under these conditions for two hours, the autoclave contents were discharged. It had the following composition:

| | Percent |
|---|---|
| Phenyl benzoate | 2.1 |
| Copper benzoate | 5.0 |
| Magnesium benzoate | 10.8 |
| Pitches | 14.8 |
| Free phenol | 4.7 |
| Benzoic acid | 62.6 |

This hydrolysis residue was subjected to a countercurrent extraction with 60% acetone according to the method described in Example 1 and gave a residue containing 96.2% of pitches, 2.7% of copper benzoate and 1.1% of phenyl benzoate.

The results obtained by carrying out the process according to the modalities illustrated in this example are much better than those obtained by operating as in Example 1.

We claim:

1. In the process for the oxidation of benzoic acid to phenol in the liquid phase in the presence of a copper catalyst and a catalyst promoter, the steps of separating useful products from the pitches contained in fractions of the liquid reaction mass which have been drained from the reactor, which comprise draining a portion of the liquid reaction mass, heating said drained fraction with 1 to 3 portions by weight of steam per portion of drained reaction mass at a temperature in the range of 180° to 240° C. and a pressure of from 3 to 12 atmospheres to achieve hydrolysis, venting the phenol-laden steam, extracting at room temperature the residue of the hydrolysis treatment with a 50 to 70% acetone-water mixture, distilling off the solvent from said extract and recovering said extract consisting of the desired useful products.

References Cited

UNITED STATES PATENTS 2,727,926  12/1955  Kaeding et al. _____ 260—621
2,852,567  9/1958  Barnard et al. _____ 260—621

LEON ZITVER, *Primary Examiner.*

D. HELFER, H. ROBERTS, *Assistant Examiners.*